Jan. 8, 1952 — R. F. OSTRANDER — 2,582,153
TOWING APPARATUS
Filed Feb. 10, 1949
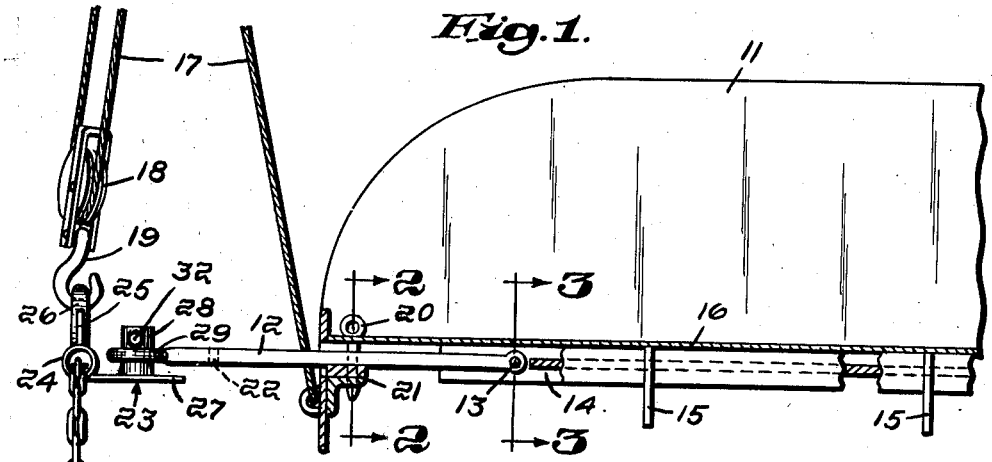
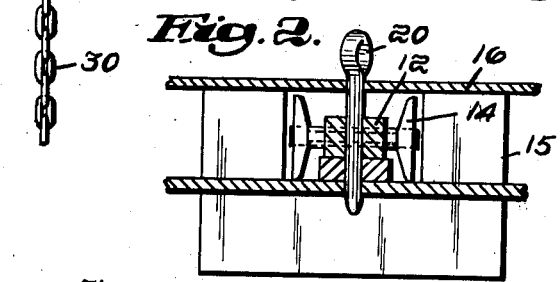
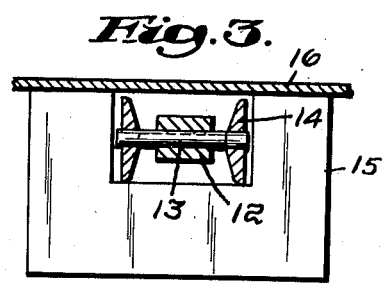
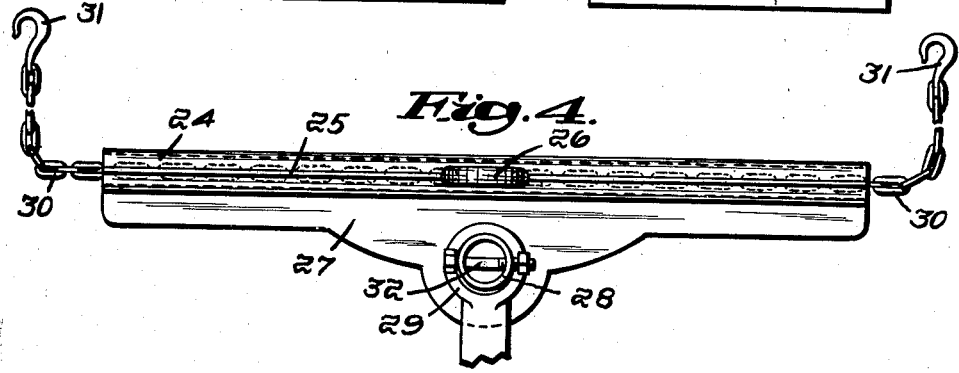
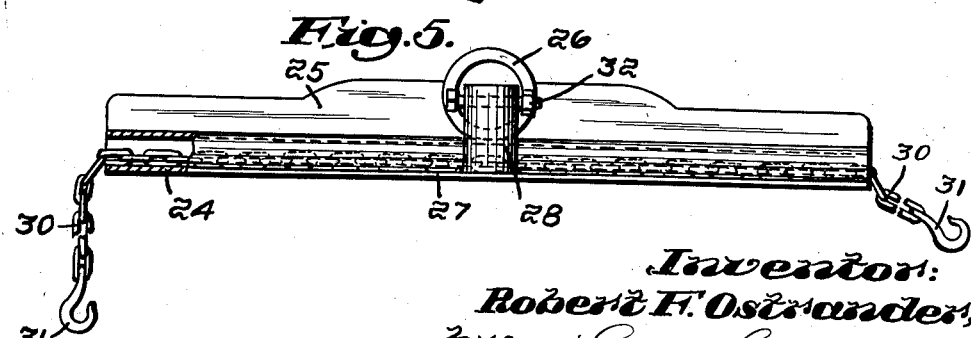
Inventor:
Robert F. Ostrander,
by Thomson & Thomson
Attorneys Patented Jan. 8, 1952

2,582,153

UNITED STATES PATENT OFFICE 2,582,153

TOWING APPARATUS

Robert F. Ostrander, Woodbridge, Conn.

Application February 10, 1949, Serial No. 75,571

2 Claims. (Cl. 214—86)

This invention relates to vehicle towing apparatus, and pertains more particularly to improvements in devices carried by crane-equipped tow cars for raising and supporting one end of a disabled passenger car or truck and conveying the vehicle to a garage or service station.

The principal purpose of the invention is to provide a simple, adaptable, convenient and efficient tow-hitch which may be quickly and securely attached to either end of a car or truck wherever located, then easily connected to any conventional crane hook by which one end of the wrecked or disabled vehicle may be raised, drawn up to and suspended at the rear of the tow car, and finally fastened to a draw bar of the tow car in such a manner that the towed vehicle is firmly supported against side sway or longitudinal movement relative to the tow car while traveling over the highway.

More specifically, it is an object of the invention to provide a rigid, hollow, manually portable saddle bar equipped with a chain slidable therethrough, whereby the saddle bar may be secured horizontally or at any desired angle across the front or back of any conventional make or type of car or truck by fastening the hooked ends of the adjustable chain to suitable portions of the rigid chassis of the disabled vehicle; the saddle bar serving as a spacer for the chain ends, and having separate center couplings by which it may be connected to the crane hook and draw bar, respectively.

A recommended embodiment of the invention is shown in the accompanying drawings, but it will be understood that the structural details of the saddle bar and other elements of the towing apparatus herein illustrated and described may be varied to suit particular conditions or purposes, without departing from the essence of this invention as defined in the appended claims. In the drawings, Fig. 1 is a fragmentary, diagrammatic, longitudinal section of the body of a crane-equipped tow car having an adjustable draw bar to which the improved saddle bar is connected and supported by the crane hook, the saddle bar being shown in end elevation;

Figs. 2 and 3 are enlarged sections on lines 2—2 and 3—3 respectively of Fig. 1;

Fig. 4 is a plan view of the saddle bar detached from the disabled car and crane, but connected to the draw bar as in Fig. 1; and Fig. 5 is a front elevation, partly broken away, of the detached saddle bar.

In the particular embodiment chosen for the purpose of illustration, the improved saddle bar which constitutes the primary feature of the invention forms part of the towing apparatus carried by the ordinary crane-equipped tow car and comprising, in general, the car body 11 (the rear end of which is shown diagrammatically in Figs. 1-3), the draw bar 12 pivoted at 13 between the sides of an I-beam 14 longitudinally slidable in brackets 15 mounted beneath the floor 16 of the tow car, and the conventional crane having suitable cables 17 carrying the sheave 18 and crane hook 19. The draw bar 12 may be adjusted to extended position, as shown in Figs. 1 and 2, by dropping a lock pin 20 through registering holes in the car floor, the bar and underlying braces 21; or it may be held in retracted position by placing the pin through the alternate draw bar hole 22 (Fig. 1).

An adjustable draw bar of this type is most satisfactory for use with the improved, manually portable saddle bar indicated generally at 23 (Fig. 1), but it will be evident that other types of draw bar mountings may be employed, and it will be appreciated that the particular type of crane carried by the tow car is not material to this invention. As hereafter explained, the crane cables may carry one boom with one crane hook, or double booms each having a crane hook, when used to support the improved saddle bar and the vehicle secured thereto.

The portable saddle bar 23 preferably comprises a rigid tube or conduit 24, which may be a heavy steel pipe 1½" in diameter and 36" long; a vertical, reinforcing web or fin 25 which may be a ¼" plate welded to and extending the full length of the pipe; a ring 26 or other coupling for receiving the crane hook 19, welded in the center of the fin plate 25; a horizontal, reinforcing fin 27 which may be another ¼" plate welded to the bottom of the pipe 24 and extending lengthwise thereof; a coupling post 28, which may be a short pipe, fixed upright as by welding or otherwise, on top of the horizontal fin at the center thereof, and adapted to be received in the ring or eye 29 at the outer end of the draw bar 12; and a stout chain 30 extending through and slidable longitudinally of the pipe 24, and preferably having hooks 31 or other couplings at its free ends. The draw bar ring may be fastened on the coupling post 28 by a bolt 32 passing through openings in the post, as shown in Figs. 1 and 4. The chain 30 may be of any desired length, for example, 12 to 15 feet.

The saddle bar may be closely and securely attached to either end of a wrecked or disabled vehicle, in horizontal position or at any desired angle with respect to the vehicle, by passing the ends of the chain 30 around or hooking them to some accessible and rigid portion of the chassis—such as the side frame, cross beam, axle, knee action mountings, or the back bars of the bumpers—and fastening the respective hooks 31 around the chain itself or on a part of the chassis. The bar is thus firmly attachable regardless of the location or position of the disabled vehicle, for it may be suitably placed across the end of the car or truck and the relative length of the chain ends may be adjusted by sliding the chain through the pipe 24, to satisfy practically any condition or situation.

The saddle is thus applicable to any type of vehicle, including the more modern cars with closely mounted bumpers to which the crane hitches heretofore available cannot be easily and satisfactorily attached. The length of the saddle bar is sufficient to span a car or truck frame, or to overlap the spaced grill guards with which most bumpers are equipped, so that the saddle may be fastened snugly against the vehicle. When so secured, the strain of lifting and dragging the vehicle is borne by the attaching chains which extend from the ends of the pipe at a 90 degree angle, thereby holding the saddle in its attached position.

For passenger cars or light trucks, a single boom crane is normally employed to lift one end of the disabled vehicle and draw it to the rear of the tow car, the sheave hook 19 of the cable being connected to the center ring 26 of the saddle. For heavy trucks, double boom cranes are usually employed, and in that case the respective cable hooks may be hooked to the chain 30 at the respective ends of the saddle bar.

In either case, after the disabled vehicle is pulled by the crane to the rear of the tow car, the saddle 23 is attached to the draw bar 12 by inserting the coupling post 28 in the draw bar ring 29 and fastening it by the bolt 32. In the normal situation, the post 28 is passed upwardly through the ring, as shown in the drawings; but for large trucks or vehicles with high chassis, the saddle may be inverted so that its coupling post is passed downwardly through the ring. In either position, the weight of the elevated end of the suspended vehicle is borne by the crane cables, and the draw bar serves merely to couple the saddle to the tow car so that the connected end of the towed vehicle cannot move longitudinally or transversely with respect to the tow car. The pivoted mounting of the draw bar nevertheless permits limited vertical movement of its outer or ring end.

If desired, the draw bar 12 may be drawn outwardly until its pivot 13 is located beyond the rear end of the floor 16 of the vehicle, and secured in extended position by dropping the lock pin 20 through a hole in the web of the I-beam 15, to afford unlimited vertical swinging movement of the draw bar during towing.

It will be appreciated that the saddle bar may also be employed in towing a vehicle capable of being moved on its own four wheels, without using a crane to lift one end. In such case, the draw bar of the tow car may be locked in retracted position, and the saddle may be spaced from the towed vehicle.

I claim:

1. In vehicle towing apparatus involving a crane-equipped tow car having a crane cable provided with a hook and a draw bar provided with a ring, a manually portable saddle bar comprising a rigid, elongate hollow tube having vertical and horizontal reinforcing fins extending longitudinally thereof, a coupling ring fixed to the vertical fin and adapted to receive the crane hook, a coupling post fixed on the horizontal fin and adapted to engage in the draw bar ring, and a chain passing through and slidable longitudinally of said tube so that the length of the respective ends of the chain may be adjusted in attaching said ends to the chassis of a disabled vehicle, to secure the saddle bar closely against one end thereof.

2. For use with vehicle towing apparatus involving a crane-equipped tow car having a crane cable provided with a hook and a draw bar provided with a ring, a manually portable saddle bar comprising a rigid, elongate pipe having a vertical reinforcing plate fixed to its upper portion and a horizontal reinforcing plate fixed to its bottom portion, said plates extending from end to end of said pipe, a coupling ring centrally disposed in the vertical reinforcing plate and adapted to receive the crane hook, an upright coupling post centrally mounted on the horizontal reinforcing plate and adapted to engage in the draw bar ring, and a chain passing through said pipe and slidable longitudinally therein, so that the length of the respective ends of the chain may be adjusted in attaching said ends to the chassis of a disabled vehicle, thereby to secure the saddle bar transversely of and close to one end of the vehicle.

ROBERT F. OSTRANDER.

REFERENCES CITED

The following references are of record in the file of this patent:

UNITED STATES PATENTS

| Number | Name | Date |
| --- | --- | --- |
| 1,116,579 | Egan | Nov. 10, 1914 |
| 1,300,649 | Raymond | Apr. 15, 1919 |
| 1,472,003 | Holt | Oct. 23, 1923 |
| 2,283,443 | Klein | May 19, 1942 |
| 2,497,379 | Vandergrift, Sr., et al. | Feb. 14, 1950 |
| 2,512,635 | Flowers | June 27, 1950 |

FOREIGN PATENTS

| Number | Country | Date |
| --- | --- | --- |
| 385,467 | Great Britain | Dec. 29, 1932 |